(12) United States Patent
Kawada (10) Patent No.: US 6,237,708 B1
(45) Date of Patent: *May 29, 2001

(54) WORKING VEHICLE

(75) Inventor: Hirohiko Kawada, Amagasaki (JP)

(73) Assignee: Kanzai Kokyukoki Mfg. Co., Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/606,049

(22) Filed: Jun. 29, 2000

(30) Foreign Application Priority Data

Jul. 8, 1999 (JP) .................................. 11-194145

(51) Int. Cl.$^7$ .................................................. B60K 25/02
(52) U.S. Cl. ............................................................ 180/53.7
(58) Field of Search ................................ 180/53.1, 53.3, 180/53.7

(56) References Cited

U.S. PATENT DOCUMENTS

| | | | |
|---|---|---|---|
| 3,209,604 | * 10/1965 | Mitchell et al. | 180/53.7 |
| 3,759,340 | * 9/1973 | Schilter | 180/53.7 |
| 4,498,349 | * 2/1985 | Nishihara | 180/53.7 |
| 4,811,614 | * 3/1989 | Lasoen | 180/53.7 |
| 4,899,525 | * 2/1990 | Takei et al. | 180/53.7 |
| 5,476,150 | * 12/1995 | Hurlburt et al. | 180/53.7 |

* cited by examiner

Primary Examiner—Kenneth R. Rice
(74) Attorney, Agent, or Firm—Sterne Kessler Goldstein & Fox P.L.L.C.

(57) ABSTRACT

A working vehicle having a main transaxle casing supporting a first PTO shaft and a center-pivot transaxle casing supporting second PTO shaft, improved in a transmission system for the second PTO shaft. Particularly, the center-pivot transaxle casing is provided at the portion thereof lower than its pivot with the second PTO shaft. The output power of the first PTO shaft is transmitted to the second PTO shaft by a propeller shaft and universal joints. If a working machine to be driven by the first PTO shaft is disposed between the both transaxle casings, the output power of the first PTO shaft is transmitted to the working machine, and afterward to the second PTO shaft.

12 Claims, 7 Drawing Sheets

Fig.7

WORKING VEHICLE

BACKGROUND OF THE INVENTION

1. Field of the Invention

The present invention relates to a working vehicle provided with a plurality of PTO shafts including an output end of a certain PTO shaft disposed oppositely to a main transaxle casing with respect to a center-Pivot transaxle casing.

2. Related Art

Conventionally, there is a well-known tractor having a center-pivot transaxle casing hung down from the lower surface of the tractor body through a center pin oriented longitudinally to the tractor, wherein the left and right ends of the axle casing can move vertically. The center pivoted transaxle casing usually supports steerable front wheels. Both of such supported left and right front wheels, even if the heights of ground surfaces to abut against the respective wheels are different, certainly grip the ground surfaces, thereby being easily steered. If the tractor is a 4WD type, the transaxle casing houses a differential gear which receives power from a main transmission for rear wheels.

There is also a well-known tractor with the center-pivot transaxle casing, which is provided with first and second PTO shafts; the first PTO shaft supported by a main transaxle casing usually for a rear-mount or mid-mount working machine, and an output end of the second PTO shaft disposed oppositely to the main transaxle casing with respect to the center-pivot transaxle casing.

The second PTO shaft has been driven by either an exclusive output shaft of an engine provided in addition to an output shaft of the engine for the main transmission in the main transaxle casing or power taken out from the main transmission. If the second PTO shaft is driven by the exclusive output shaft of the engine, the transmission system is extremely simplified and shortened because the engine is generally disposed in vicinity of the second PTO shaft or the center-pivot transaxle casing, however, the engine having the additional output shaft is expensive.

The second PTO shaft disposed in vicinity of the center-pivot transaxle casing must be prevented from interference with the center-pivot transaxle casing which tilts around the center pin during the traveling of the tractor. Conventionally, the second PTO shaft has been rotatably supported either through a tubal center pin pivoting the center-pivot transaxle casing or by a portion of the center-pivot transaxle casing lower than the center pin.

The second PTO shaft disposed through the tubal center pin is positionally fixed, thereby being fitted to be connected directly or through gears to the exclusive output shaft of the engine without a flexible transmission system. However, there arises the above-mentioned problem of expensiveness because of the unique engine.

If a transmission system is interposed between the second PTO shaft through the tubal center pin and the main transmission in the main transaxle casing, a center pin bracket usually formed of a vehicle frame is required to be further processed for supporting the second PTO shaft and parts for transmitting power to the second PTO shaft, thereby making the manufacture of the vehicle frame complicated and expensive. Also, a space for disposal of the transmission system between the main transmission and the second PTO shaft is limited between the main transaxle casing and the center pin, where an engine, a transmission system between the engine and the main transmission, a propeller shaft between the main transmission and the differential gear in the center-pivot transaxle casing and the like are concentrated. Thus, the transmission system between the main transmission and the second PTO shaft is difficult to be located and must bypass other parts, thereby being complicated, redundant and expensive. Furthermore, the center pin is generally higher than an input shaft of a working machine to be driven by the second PTO shaft. Thus, the transmission system between the second PTO shaft and the input shaft of the working machine is also complicated and redundant.

If the second PTO shaft is rotatably supported by a portion of the center-pivot transaxle casing lower than the center pin so as to be substantially as high as the input shaft of the working machine to be driven by the second PTO shaft, the transmission system between the second PTO shaft and the input shaft of the working machine is simplified and shortened.

However, it is still expensive to provide an additional exclusive output shaft for driving the second PTO shaft on whether an engine or the main transaxle casing. Particularly, if such an exclusive output shaft is provided on the main transaxle casing, the output shaft becomes adjacent to the first PTO shaft, thereby complicating the main transaxle casing. Furthermore, if a working machine driven by the first PTO shaft is disposed in the space between the main transaxle casing and the center-pivot transaxle casing, it should be considerable how to transmit power from the main transmission to the second PTO shaft.

SUMMARY OF THE INVENTION

The object of the present invention regarding a working vehicle having a main transaxle casing and a center-pivot transaxle casing distributed between front and rear portions of the vehicle, and having a longitudinal first PTO shaft supported by the main transaxle casing and a longitudinal second PTO shaft whose output end is disposed oppositely to the main transaxle casing with respect to the center-pivot transaxle casing is to provide an improved arrangement for transmitting power taken out from the transmission in the main transaxle casing to the second PTO shaft through a simple linkage in a sufficiently large space and for simplifying the transmission system between the second PTO shaft and a working machine driven by the second PTO shaft.

To achieve the object, the second PTO shaft according to the present invention preferably penetrates a portion of the center-pivot transaxle casing lower than a pivot shaft of the center-pivot transaxle casing, thereby reducing the difference of height between the second PTO shaft and an input shaft of the working machine driven by the second PTO shaft so as to simplify a transmission system interposed between them. The pivot shaft is directed longitudinally relative to the vehicle, in other words, in parallel to the second PTO shaft. The center-pivot transaxle casing can tilt around the pivot shaft, thereby enabling left and right ends of the center-pivot casing to move vertically. The second PTO shaft revolves together with the center-pivot transaxle casing around the pivot shaft, so that the second PTO shaft does not interfere with the center-pivot transaxle casing or axles supported by the center-pivot transaxle casing.

The second PTO shaft supported by the center-pivot transaxle casing as such is driven by the output power of the first PTO shaft. Accordingly, both an engine and the main transaxle casing are free from need of an exclusive output shaft for driving the second PTO shaft, thereby being simplified. An output end of the first PTO shaft and an input end of the second PTO shaft are directed so as to face each other. A transmission system between the first PTO shaft and the second PTO shaft can be disposed in a large vacant space between the main transaxle casing and the center-pivot transaxle casing without consideration of bypass, thereby being shortened and simplified. The transmission system may be constituted by a propeller shaft and universal joints.

If a working machine to be driven by the first PTO shaft is disposed between the main transaxle casing and the center-pivot casing, the output power of the first PTO shaft is transmitted through the working machine to the second PTO shaft. A first transmission system is interposed between the output end of the first PTO shaft and an input terminal of the working machine, and a second transmission system is interposed between an output terminal of the working machine for driving the second PTO shaft and the input end of the second PTO shaft. Each of the first and second transmission systems may be constituted by a propeller shaft and universal joints, thereby being simplified. Both ends of a single shaft may be defined as the input and output terminals of the working machine, thereby shortening and simplifying the transmission system including the first and second transmission systems between the first PTO shaft and the second PTO shaft. Thus, two working machines can be driven by the first and second PTO shafts with PTO transmission systems shortened and simplified as much as possible.

Other objects, features and advantages of the present invention will be apparent from the following description taken in connection with the accompanying drawings.

DETAILED DESCRIPTION OF THE PREFERRED EMBODIMENTS

Figure 1:
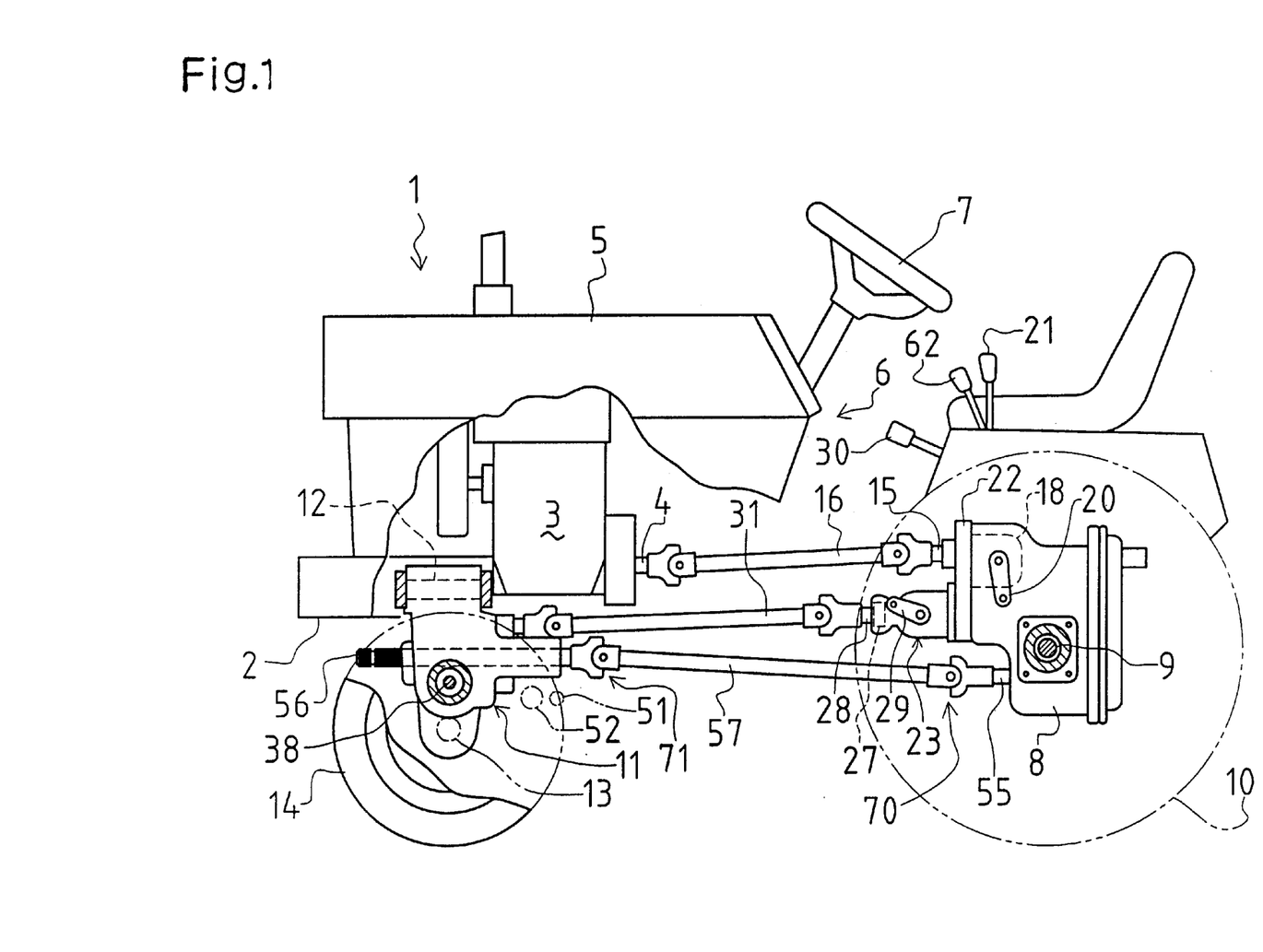
FIG. 1 is a side view of an entire tractor according to an embodiment of the present invention.
Figure 2:
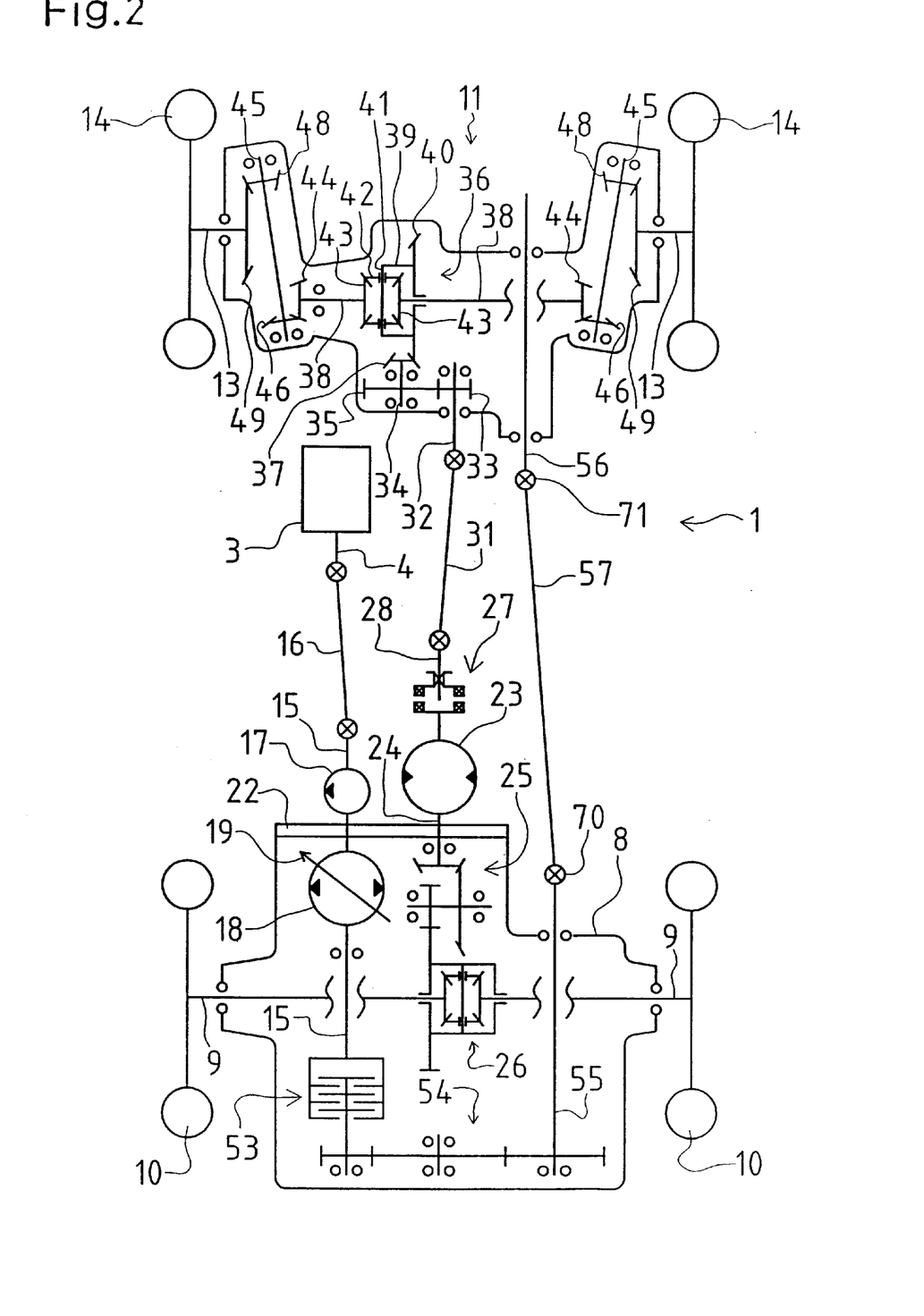
FIG. 2 is a diagram of entire driving systems for traveling and PTO shafts.

Referring to FIGS. 1 and 2, a tractor 1 according to the present invention is provided at its front portion with an engine frame 2. An engine 3 and the like are mounted on engine frame 2 and covered with a hood 5. A dashboard 6 is disposed at the rear end of hood 5 and a steering wheel 7 is provided above dashboard 6. A rear transaxle casing 8 serving as a main transaxle casing is provided at a rear portion of tractor 1. As discussed later, rear transaxle casing 8 is provided therein with a rear differential gear arrangement 26 and a main transmission including a deceleration gear arrangement 25 for transmitting the power of engine 3 to rear differential gear arrangement 26. Left and right rear axles 9 are laterally extended from rear transaxle casing 8 so as to be provided at their outer ends with rear wheels 10.

A pair of front and rear brackets 2a is formed of engine frame 2. Between brackets 2a is disposed the top of lateral middle portion of a front transaxle casing 11 serving as a center-pivot transaxle casing. Both brackets 2a and the top portion of front transaxle casing 11 are pierced by a center pin 12 in a longitudinal direction of tractor 1. Front transaxle casing 11 hangs down on center pin 12 and can tilt vertically around center pin 12. As later detailed, left and right front axles 13, which are tilted forwardly and backwardly by the operation of steering wheel 7, project laterally outwardly from the left and right side ends of front transaxle casing 11, and are provided at their outer ends with front wheels 14.

The front surface of rear transaxle casing 8 is covered with a vertical front end cover 22. In rear transaxle casing 8 is disposed a variable displacement hydraulic pump 18 which is mounted backwardly onto the upper rear surface of front end cover 22. A hydraulic motor 23 is mounted forwardly onto the lower front surface of front end cover 22. Hydraulic motor 23 is contained in an exclusive housing. Front end cover 22 forms therein a closed oil circuit through which hydraulic pump 18 and hydraulic motor 23 are fluidly connected with each other, thereby constituting a hydrostatic stepless transmission (an HST).

A control arm 20 (shown in FIG. 1) interlocking with a movable swash plate 19 for varying the capacity of hydraulic pump 18 is connected with a speed changing lever 21 in vicinity of an operator's seat through a linkage (not shown). Speed changing lever 21 is slantingly operated so as to vary the direction and amount of pressure oil flowed from hydraulic pump 18, thereby varying the rotary direction and speed of output shaft 24 of hydraulic motor 23 for switching the traveling direction of tractor 1 between forward and backward and for change of traveling speed of tractor 1.

An input shaft 15, which is used as a pump shaft of hydraulic pump 18 in rear transaxle casing 8, projects forwardly from front end cover 22 so as to be drivingly connected with an output shaft 4 of engine 3 through a propeller shaft 16 and universal joints.

As shown in FIG. 2, output shaft 24, which is integral with a motor shaft of hydraulic motor 23, is inserted into rear transaxle casing 8. The rotation of output shaft 24 is transmitted to rear axles 9 through deceleration gear arrangement 25 and rear differential gear arrangement 26 in rear transaxle casing 8, thereby driving rear wheels 10.

In the housing (not shown in FIG. 2) of hydraulic motor 23, output shaft 24 also projects forwardly into connection with a front wheel driving shaft 28 through a clutch 27. A clutch control lever 29 is, as shown in FIG. 1, pivoted onto a side portion of the housing of hydraulic motor 23 so as to engage and disengage clutch 27. A driving mode switching lever 30 interlocking with clutch control lever 29 is disposed in vicinity of the operator's seat. Driving mode switching lever 30 is operated so as to switch the driving mode of tractor 1 between 4 WD and 2 WD.

Front wheel driving shaft 28 projects forwardly from the housing enclosing hydraulic motor 23 and clutch 27. An input shaft 32 projects backwardly from front transaxle casing 11. A front wheel propeller shaft 31 and universal joints are interposed between both shafts 28 and 32.

Referring to FIGS. 2–6, description will be given on the construction of front transaxle casing 11.

Figure 3:
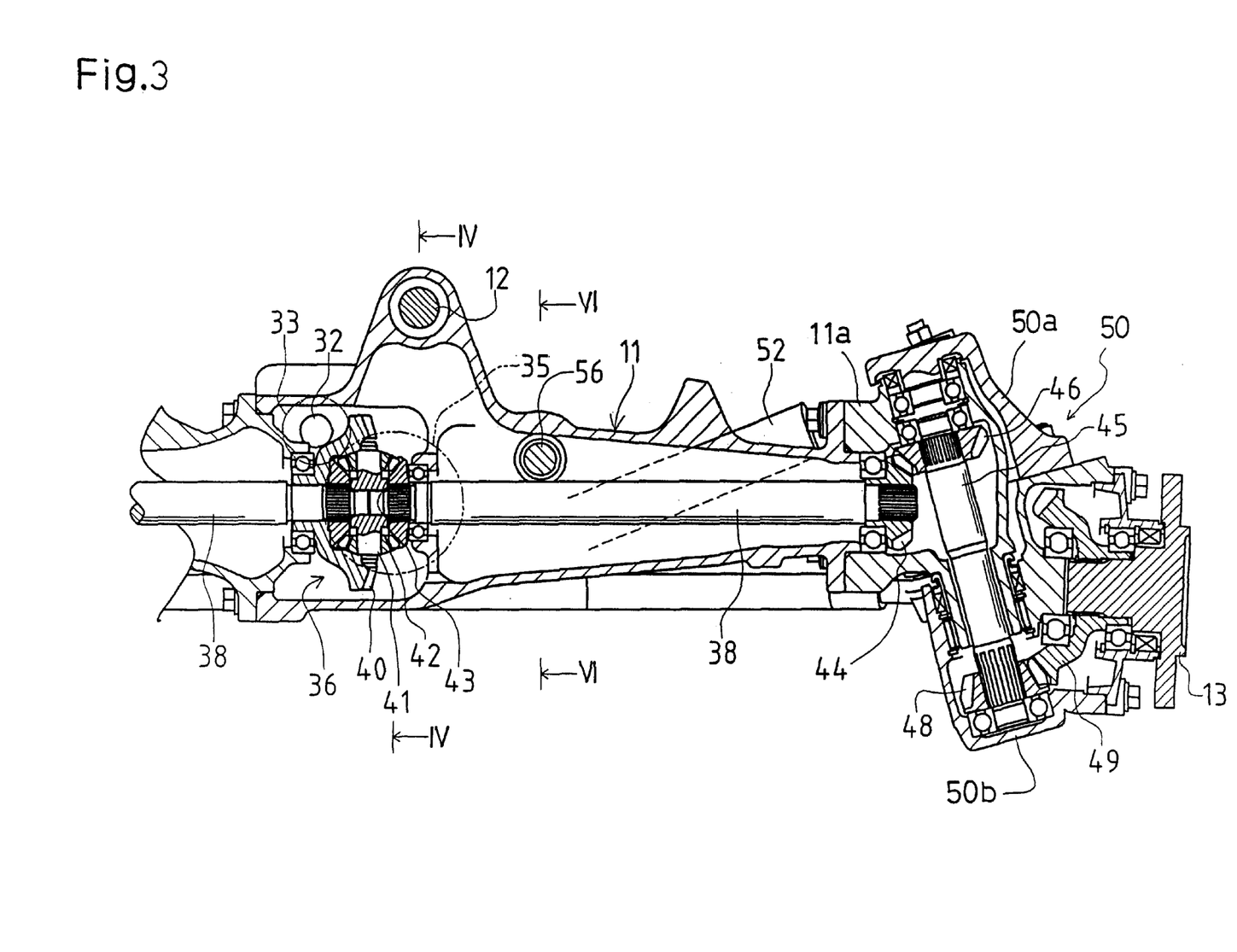
FIG. 3 is a front sectional view of a front transaxle casing including a center pin, front axles and a front PTO shaft.

As shown in FIG. 3, front transaxle casing 11 is laterally extended and pivoted at its laterally middle top portion onto engine frame 2 (between both brackets 2a) through longitudinal center pin 12. During the traveling of tractor 1, front transaxle casing 11 tilts so that its left and right ends move vertically corresponding to the difference of height of ground surface in the lateral direction of tractor 1, thereby making both front wheels 14 grip the ground surface constantly.

As shown in FIGS. 2 and 3, input shaft 32 is oriented in longitudinal direction of tractor 1. In front transaxle casing 11, a gear 33 is fixed onto a front end of input shaft 32. In the same, a deceleration shaft 34 is journaled in parallel to input shaft 32, and a counter gear 35 is fixed on deceleration shaft 34 so as to engage with gear 33.

In the lateral middle portion of front transaxle casing 11 is disposed a front differential gear arrangement 36. In front transaxle casing 11, a pair of differential yoke shafts 38 extend both leftwardly and rightwardly from front differential gear arrangement 36. Both differential yoke shafts 38 are differentially connected with each other through front differential gear arrangement 36.

Figure 4:
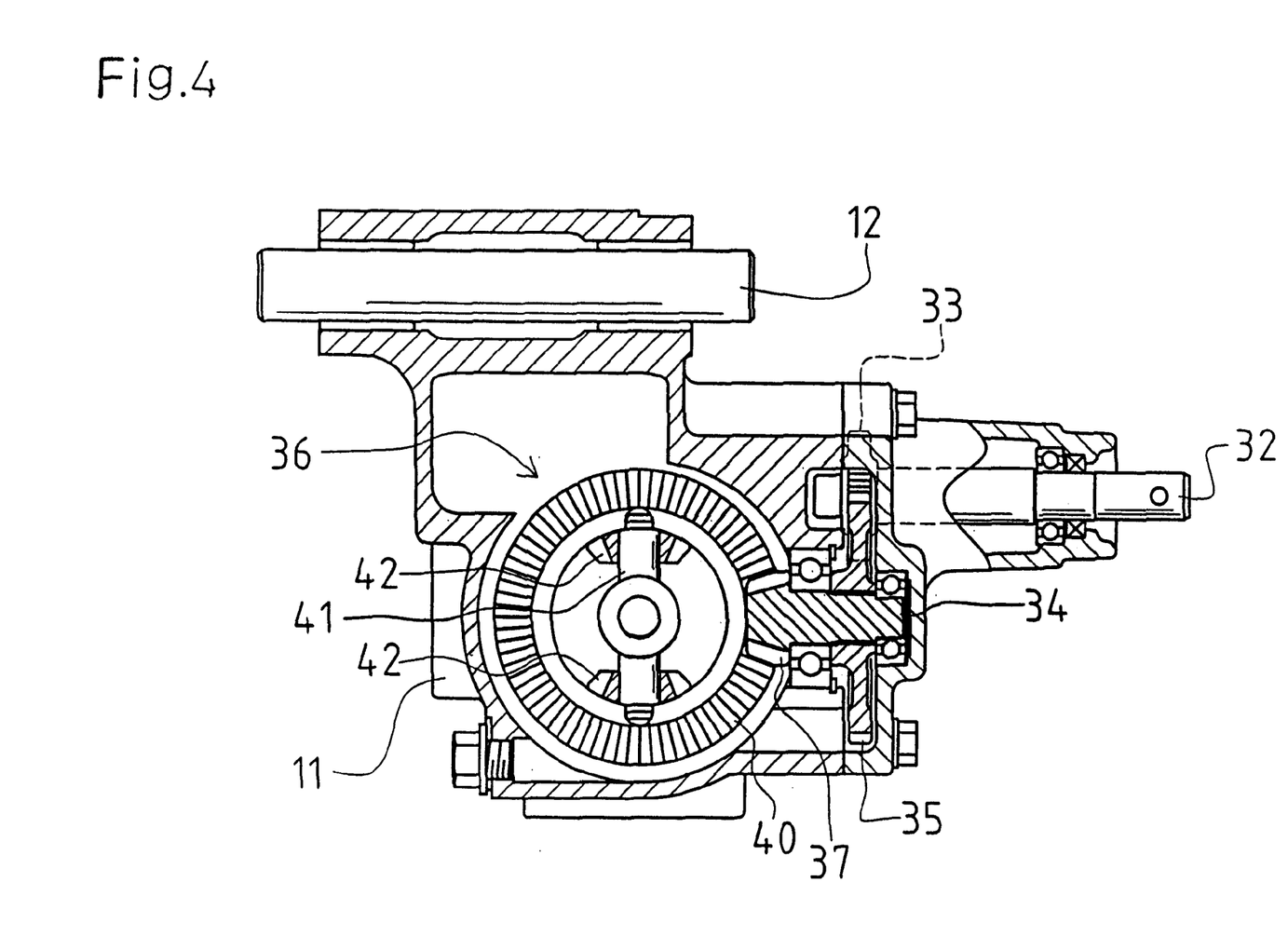
FIG. 4 is a sectional view taken on line IV—IV in FIG. 3.

Front differential gear arrangement 36 is customary as shown in FIGS. 2–4. A differential casing 39 is journaled by front transaxle casing 11. A ring gear 40 fixed on differential casing 39 and a bevel gear 37 fixed on deceleration shaft 34 engage with each other. A differential pinion shaft 41 is disposed in differential casing 39. A pair of differential pinions 42 are rotatably disposed on differential pinion shaft 41. Inward ends of both differential yoke shafts 38, facing each other, are fixedly provided thereon with differential side gears 43 like a bevel gear, respectively. Each differential side gear 43 engages with both differential pinions 42.

As shown in FIGS. 2 and 3, each differential yoke shaft 38 is fixedly provided on its outward end with a bevel gear 44. A kingpin holder 11a is fixed to each of left and right ends of front transaxle casing 11. In kingpin holder 11a is axially rotatably disposed a kingpin shaft 45 which is approximately vertical but slants outwardly from top to bottom. On the top portion of kingpin shaft 45 is fixed a bevel gear 46 in engagement with bevel gear 44.

Kingpin holder 11a is contained in a knuckle arm 50 which consists of an upper portion 50a and a lower portion 50b fixedly joining with each other. Knuckle arm 50 is fitted onto kingpin holder 11a through bearings so as to be rotatable around the axis of kingpin shaft 45. Kingpin shaft 45 projects downwardly from kingpin holder 11a so as to be fixedly provided thereon with a bevel gear 48. The bottom end of kingpin shaft 45 is rotatably supported onto the bottom end of knuckle arm 50 (lower portion 50b).

Front axle 13 is horizontally journaled by knuckle arm 50 (lower portion 50b). Outside knuckle arm 50, front axle 13 forms a flange to be fixed to front wheel 14. In knuckle arm 50, a final deceleration gear 49 is fixed on front axle 13 so as to engage with bevel gear 48.

Figure 5:
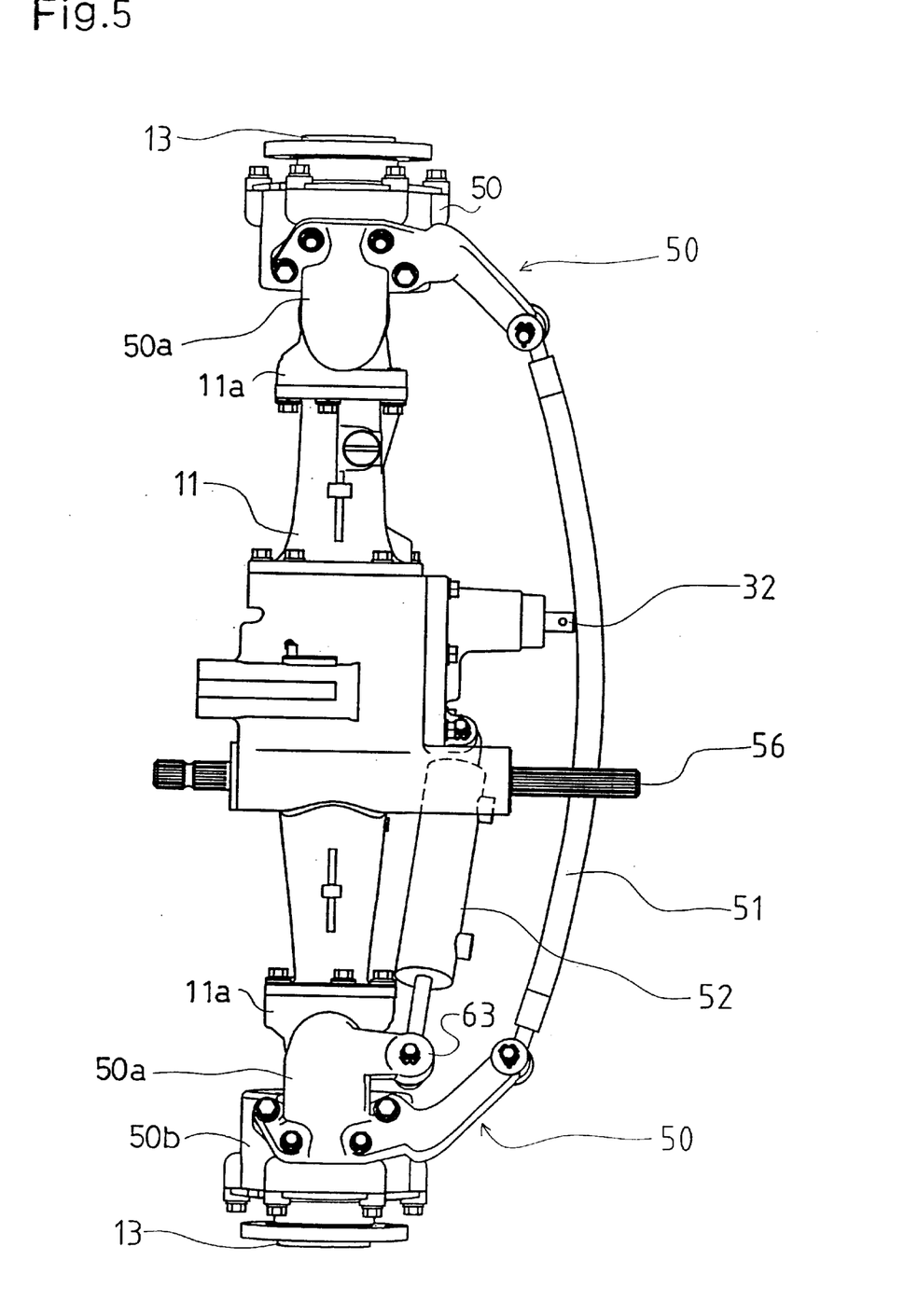
FIG. 5 is a plan view of the front transaxle casing.

As shown in FIG. 5, left and right knuckle arms 50 are connected with each other through a tie rod 51. One of both knuckle arms 50 (upper portions 50a) is provided with a backwardly projecting bracket 63. A hydraulic cylinder 52 is interposed vertically slantwise between bracket 63 and a suitable rear end portion of front transaxle casing 11. The direction and angle of operated steering wheel 7 determines the extension of a piston rod of hydraulic cylinder 52. According to the actuation of hydraulic cylinder 52, left and right knuckle arms 50 are rotated around respective kingpin shafts 45, thereby making front wheels 14 turn laterally.

Hydraulic cylinder 52 is a double acting cylinder in fluid connection with a hydraulic pump 17 shown in FIG. 2 through a hydraulic circuit. The hydraulic circuit is provided with a control valve (not shown) interlocking with steering wheel 7, which controls the driving direction and degree of piston rod of hydraulic cylinder 52. Thus, a power steering system is constructed, thereby reducing an operating force for rotating steering wheel 7.

Description will now be given on a power-taking-out system which takes out power for driving a front-mount working machine from the main transmission in rear transaxle casing 8.

As shown in FIG. 2, in rear transaxle casing 8, input shaft 15 of hydraulic pump 18 further extends backwardly so as to be connected with a PTO deceleration gear arrangement 54 comprising plain gears through a hydraulically operable wet multiple disc clutch 53. As shown in FIG. 2, a final rotary shaft of PTO deceleration gear arrangement 54 projects forwardly from a lower front portion of rear transaxle casing 8, thereby serving as a mid PTO shaft (a first PTO shaft) 55.

Figure 6:
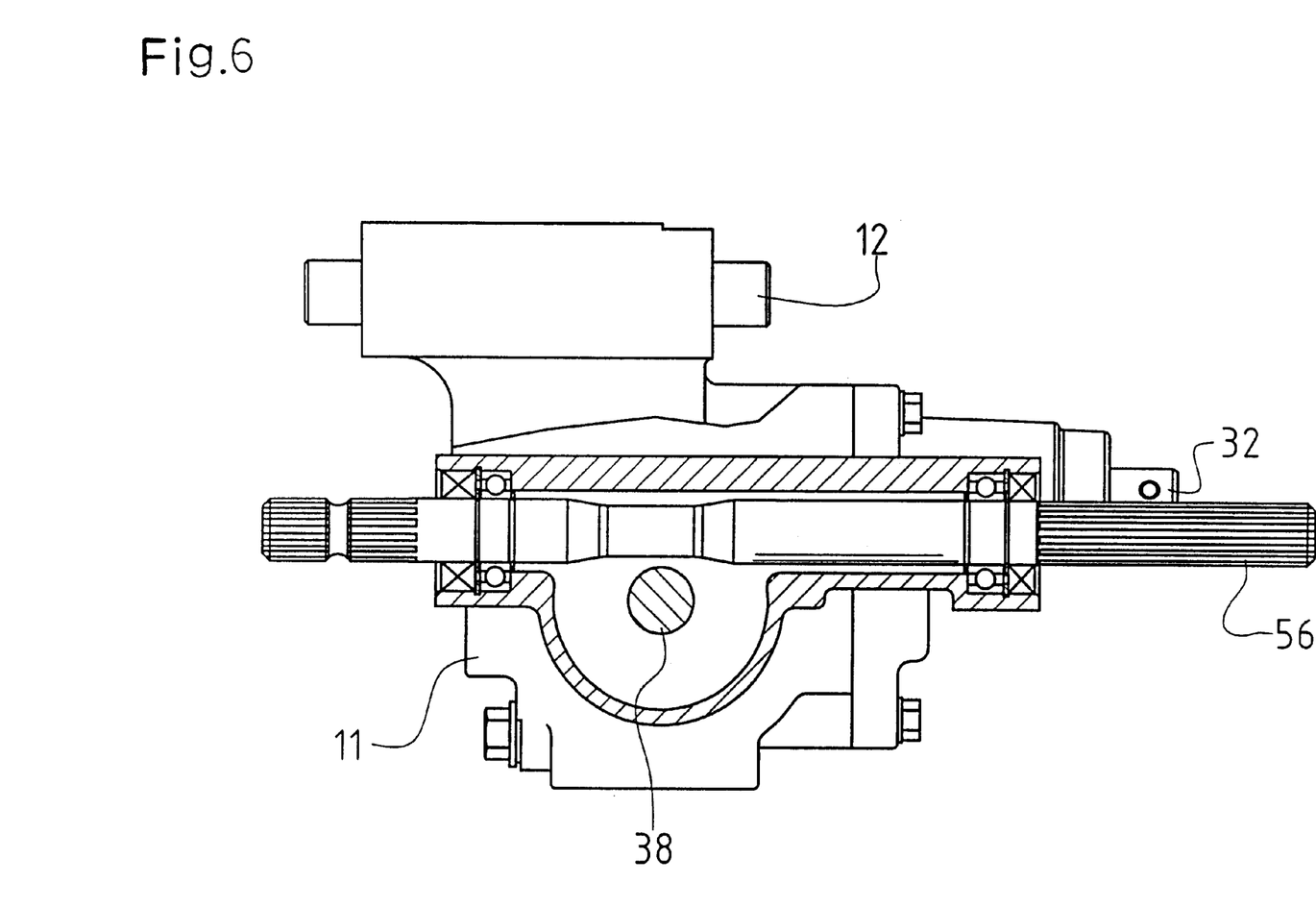
FIG. 6 is a sectional view taken on line VI—VI in FIG. 3.

As shown in FIGS. 1–3, 5 and 6, a front PTO shaft (a second PTO shaft) 56 is journaled in a state of longitudinal penetration through a portion of front transaxle casing 11 which is lower than center pin 12 and above (or, at need, below) one of differential yoke shafts 38 so as to prevent front PTO shaft 56 from interference with differential yoke shaft 38 and front differential gear arrangement 36. As best shown in FIG. 6, front PTO shaft 56 provides its rear end backwardly projecting from front transaxle casing 11 for input of power and its front end forwardly projecting from front transaxle casing 11 for output of power.

A front-mount working machine like a snow remover is disposed in front of tractor 1 and driven by front PTO shaft 56. Front PTO shaft 56 according to this embodiment is preferred to that disposed through a tubal center pin because the difference of height between an input shaft of the front-mount working machine and correctly low-positioned front PTO shaft 56 is sufficiently minimized so that a transmission course therebetween is sufficiently shortened.

A propeller shaft 57 is interposed between the front end of mid PTO shaft 55 and the rear end of front PTO shaft 56. A universal joint 70 connects mid PTO shaft 55 and propeller shaft 57 with each other. A universal joint 71 connects front PTO shaft 56 and propeller shaft 57. Hence, front PTO shaft 56 is driven by the output power of mid PTO shaft 55. The space between both shafts 55 and 56 is below propeller shafts 16 and 31, engine 3 and so on. There is disposed nothing but the transmission system interposed between shafts 55 and 56. For that reason, the transmission system from mid PTO shaft 55 to front PTO shaft 56, consisting of only propeller shaft 57 and universal joints 70 and 71, is as short and simple as possible.

Tractor 1 is occasionally provided at its midway bottom position, in other words, between front and rear transaxle casings 11 and 8 with a mid-mount working machine to be driven by mid PTO shaft 55. Referring to an embodiment shown in FIG. 7, there is disposed a mower 58. Mower 58 is provided at its top portion with a longitudinal transmission shaft 59. Between the front end of mid PTO shaft 55 and the rear end of transmission shaft 59 is interposed a propeller shaft 60 and universal joints serving as a first transmission system. Between the front end of transmission shaft 59 and the rear end of front PTO shaft 56 is interposed a propeller shaft 61 and universal joints serving as a second transmission system. Transmission shaft 59 defines its rear end as an input terminal for the mower 59, and its front end as an output terminal for front PTO shaft 56.

Figure 7:
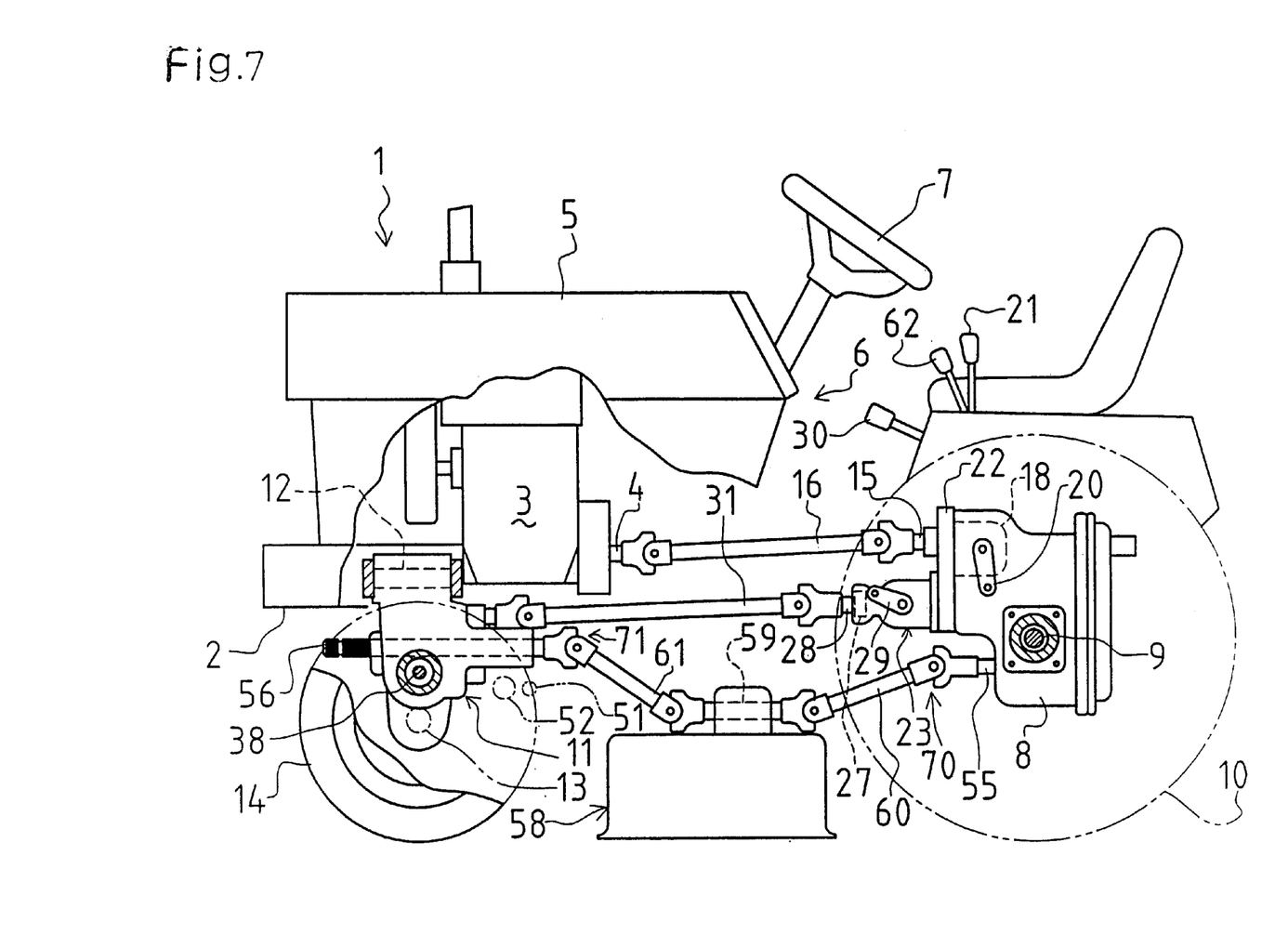
FIG. 7 is a side view of the tractor shown in FIG. 1 when the tractor is provided at its lower middle portion with a mower.

Hence, the output power of mid PTO shaft 55 is transmitted to the mid-mount working machine, and afterwards, to front PTO shaft 56 so as to drive a front-mount working machine too.

For attaching only the mid-mount working machine without the front-mount working machine to tractor 1, the second transmission system comprising propeller shaft 61 and the universal joints may be removed. Front PTO shaft 56, if it is unnecessary, may be removed from front transaxle casing 11, and the shaft hole of front transaxle casing 11 for front PTO shaft 56 may be plugged.

Although the invention has been described in its preferred form with a certain degree of particularity, it is understood that the present disclosure of the preferred form has been changed in the details of construction and the combination and arrangement of of parts may be resorted to without departing from the spirit and the scope of the invention as hereinafter claimed.

What is claimed is:

1. A working vehicle comprising:
    a plurality of PTO shafts including a first PTO shaft and a second PTO shaft, both of said first and second PTO shafts being oriented in a longitudinal direction of said vehicle, wherein said second PTO shaft is driven by the output power of said first PTO shaft.

2. The working vehicle as set forth in claim 1, wherein an output end of said first PTO shaft and an input end of said second PTO shaft are disposed so as to face each other, and wherein a propeller shaft and universal joints are interposed between both of said first and second PTO shafts.

3. The working vehicle comprising:
    a plurality of PTO shafts including a first PTO shaft and a second PTO shaft driven by the output power of said first PTO shaft, both of said first and second PTO shafts being oriented in a longitudinal direction of said vehicle;
    a main transaxle casing supporting said first PTO shaft, said main transaxle casing being disposed at one of front and rear portions of said vehicle; and
    a center-pivot transaxle casing disposed at the other of front and rear portions of said vehicle, a laterally intermediate portion of said center-pivot transaxle casing being pivoted onto said vehicle through a pivot shaft oriented in a longitudinal direction of said vehicle so as to enable left and right ends of said center-pivot transaxle casing to move vertically, wherein said second PTO shaft rotatably penetrates said center-pivot transaxle casing longitudinally.

4. The working vehicle as set forth in claim 3, wherein said second PTO shaft is disposed in a portion of said center-pivot transaxle casing lower than said pivot shaft.

5. The working vehicle as set forth in claim 3, wherein an output end of said first PTO shaft and an input end of said second PTO shaft are disposed so as to face each other, and wherein a propeller shaft and universal joints are interposed between both of said first and second PTO shafts.

6. The working vehicle comprising:
    a plurality of PTO shafts including a first PTO shaft and a second PTO shaft driven by the output power of said first PTO shaft, both of said first and second PTO shafts being oriented in a longitudinal direction of said vehicle, wherein the output power of said first PTO shaft is transmitted through a working machine to said second PTO shaft.

7. The working vehicle as set forth in claim 6, further comprising:
    a main transaxle casing supporting said first PTO shaft, said main transaxle casing being disposed at one of front and rear portions of said vehicle, and
    a center-pivot transaxle casing disposed at the other of front and rear portions of said vehicle, a laterally intermediate portion of said center-pivot transaxle casing being pivoted onto said vehicle through a pivot shaft oriented in a longitudinal direction of said vehicle so as to enable left and right ends of said center-pivot transaxle casing to move vertically, wherein said second PTO shaft rotatably penetrates said center-pivot transaxle casing longitudinally, and wherein said working machine driven by said first PTO shaft is disposed between said main transaxle casing and said center-pivot transaxle casing.

8. The working vehicle as set forth in claim 7, wherein said second PTO shaft is disposed in a portion of said center-pivot transaxle casing lower than said pivot shaft.

9. The working vehicle as set forth in claim 7, wherein an output end of said first PTO shaft and an input end of said second PTO shaft are disposed so as to face each other, and wherein a first transmission system is interposed between said output end of said first PTO shaft and an input terminal of said working machine, and a second transmission system is interposed between an output terminal of said working machine and said input end of said second PTO shaft.

10. The working vehicle as set forth in claim 9, wherein both said input terminal and output terminal of said working machine is constituted by a single shaft.

11. The working vehicle as set forth in claim 9, wherein at least one of said first and second transmission systems is constituted by Propeller shaft and universal joints.

12. A working vehicle comprising:
    a vehicle frame;
    a prime mover mounted on said vehicle frame;
    a first transaxle casing and a second transaxle casing distributed between front and rear of said vehicle, said first transaxle casing being fixed to said vehicle frame and said second transaxle casing being pivoted to said vehicle frame through a center pin oriented in a longitudinal direction of said vehicle;
    a pair of first drive wheels rotatably supported onto respective left and right ends of said first transaxle casing;
    a transmission disposed in said first transaxle casing for transmitting power of said prime mover to said pair of first drive wheels;
    a pair of second drive wheels rotatably supported onto respective left and right ends of said second transaxle casing;
    a first PTO shaft driven by said prime mover, said first PTO shaft rotatably supported by said first transaxle casing toward said second transaxle casing;
    a second PTO shaft oriented in a longitudinal direction of said vehicle, said second PTO shaft being rotatably supported by a portion of said transaxle casing below said center pin and projecting at its both ends forward and rearward from said second transaxle casing so that a first end of said second PTO shaft is directed toward said first transaxle casing and a second PTO shaft is directed to an outside of said vehicle in opposite to said first transaxle casing, and
    driving connection means interposed between said output end of said first PTO shaft to said second PTO shaft, thereby driving a working machine disposed at said outside of said vehicle in driving connection with said second end of said second PTO shaft.

* * * * *

UNITED STATES PATENT AND TRADEMARK OFFICE
Certificate

Patent No. 6,237,708
Patented: May 29, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hirohiko Kawada, Amagasaki, JP; and James E. Hardzinski, Matthews, NC.

Signed and Sealed this Twenty-third Day of September 2003.

ROBERT OLSZEWSKI
*Acting Supervisory Patent Examiner*
Art Unit 3627